United States Patent [19]

Rasada, Jr. et al.

[11] 4,151,895
[45] May 1, 1979

[54] RECREATIONAL VEHICLE LADDER

[76] Inventors: Frank M. Rasada, Jr., 7912 LaRiviera Dr., Sacramento, Calif. 95826; John A. Starr, 1856 Cherry Ave., Long Beach, Calif. 90806

[21] Appl. No.: 857,002

[22] Filed: Dec. 2, 1977

[51] Int. Cl.$^2$ .................... E06C 5/02; E06C 7/08
[52] U.S. Cl. ......................... 182/93; 182/194; 182/228
[58] Field of Search ............... 182/228, 194, 206, 46, 182/93, 99, 204, 215, 196–198

[56] References Cited

U.S. PATENT DOCUMENTS

| | | | |
|---|---|---|---|
| 1,349,125 | 8/1920 | Full | 182/228 |
| 3,944,024 | 3/1976 | Adas | 182/228 |

FOREIGN PATENT DOCUMENTS 1459289 10/1966 France .................................. 182/228

Primary Examiner—Reinaldo P. Machado
Attorney, Agent, or Firm—Fulwider, Patton, Rieber, Lee & Utecht

[57] ABSTRACT

A ladder is provided for use with a recreational vehicle in which step treads are formed in two parts. The treads are divided generally along a plane defined by the disposition of the upright ladder rails. The two parts of the stair treads are positioned on either side of the rails and are clamped together in interlocking fashion by means of engageable arms on each step portion which extend toward each other to latch together. Positioned on the upright ladder rails, the ladder steps are securely attached thereto by means of self tapping screws which pass through the opposing step sections and through the ladder rails to sandwich the ladder rails between the step sections.

7 Claims, 4 Drawing Figures

## RECREATIONAL VEHICLE LADDER

FIELD OF THE INVENTION

The present invention relates to upright ladders which have a pair of rails mounted in vertical or near vertical orientation and between which ladder steps laterally extend in vertically spaced disposition. Such ladders find particular utility in association with recreational vehicles, although the form of construction according to the invention is also useful for swimming pool ladders, playground ladders, fire escape ladders, dock ladders and the like.

BACKGROUND OF THE INVENTION

In recent years the popularity and the varied manner of utilization of recreational vehicles has increased considerably. Recreational vehicles frequently take the form of motor vehicles which include a compartment located behind the vehicle cab of sufficient height to accommodate the entry and occupancy thereof by individuals utilizing the recreational vehicle. Such recreational vehicles often take the form of temporary mobile homes, campers, vans, camper compartments mounted on pick up trucks, and vehicles employing other types of large compartments the roofs of which are inaccessible to a person without some form of aid in ascending. To allow people to climb and reach the roofs of such vehicles in order to position baggage, repair equipment, to check the fastenings of cargo stored overhead, to make observations and so forth, recreational vehicles have in the past been supplied with upright ladders having vertically space steps or rungs.

The conventional form which such auxiliary ladders take involves a construction in which upright rails or stringers are provided and upon which unitary steps are mounted. The utilization of such single piece steps involves considerable disadvantages. To assemble conventional ladders in which the steps are formed of a single structure, holes are first formed in the steps at the proper distance of rail spacing. The steps must then be strung on to the rails. That is, the steps one by one are inserted onto the ends of the rails with the rails passing through the holes in the steps provided for this purpose. The steps are then worked along the rails away from the ends thereof toward their appropriate positions. The steps are then secured in place by conventional means, such as screws or bolts or welding.

The assembly of conventional ladders can only be performed with considerable effort. It is frequently very difficult to work the unitary ladder steps longitudinally along the rails, since, if the steps are properly formed, there is a close fit between the rails and the apertures in the steps to accommodate the rails. It is therefore quite important in manipulating the steps along the rails to at all times maintain the steps percisely normal with respect to both rails. This is extremely difficult, as progress in working the steps along the rails tends to be uneven, thereby causing the steps to become cocked or tilted relative to their proper orientation on the rails. Working the steps into their proper positions thereby becomes an arduous and time consuming job at best.

The conventional manner of ladder construction involves other disadvantageous features. In working the individual steps onto the rails, the steps, when temporarily misaligned tend to score and scratch the rails. The paint finish of painted rails almost invariably becomes severely scratched and the rails themselves frequently become scored with unslightly indentations which result from the unintentional twisting of the steps relative to the rails during assembly. Furthermore, even slight imperfections in the cross section of the rails make assembly of steps thereon exceedingly difficult. For example, if a rail has been struck or bent slightly prior to stringing the steps, the steps frequently can not even be assembled on to the rails at all, since the apertures will not allow the steps to be moved past such imperfections in the rail cross section.

A further disadvantage of conventional recreational vehicle ladder construction is that because the unitary steps must be moved along the lengths of the rails to their proper positions, rails of any cross section other than of a uniform cross section throughout are precluded. In some instances, it would be quite advantageous for rails to be formed of a nonuniform cross section. Englargements along the rails might be provided for additional support for the ladder steps or as means for attachment to the vehicle. For example, the ends of the rails, rather than assuming the conventional circular cross section throughout, might terminate in flattened tabs which could be bolted onto the vehicle or onto mounting brackets.

It is an object of the present invention to provide an improved form of ladder construction to obviate the foregoing difficulties. The present invention does not employ unitary steps which must be mounted on the ladder from the ends of the rails. Rather, the present invention employs bifurcated steps divided generally along a plane passing through the two rails.

It should be understood that in the use of bifurcated steps according to the present invention the exact division between the two sections of the steps need not conform to any particular geometry. That is, the division between the sections can be irregular as long as the sections can be fitted into contact with the upright rails of the ladder from opposite sides thereof to cooperate to entrap the rails therebetween. It is necessary only that the sections of the steps are freely moveable transversely toward the rails to assume a position in snug contact therewith. Thus, when rails of circular cross section are employed it is necessary that the recesses formed in the step sections to receive the rails not exceed 180°. Also, if the rails are equipped with any laterally extending flanges or projections, the division between the steps sections must be such that the two sections together can be moved to encompass such projections. These constraints are directed to the end that none of the step sections need be installed from the ends of the rails.

A further object of the invention is the provision of divided ladder steps which once mounted, will remain in position on the rails. For this reason, each of the two sections or segments of a step is provided with arms that extend toward the opposite section or segment. The arms of one step section are provided with connectors, such as hooks while the opposing arms of the opposite step section are provided with means for receiving the connectors such as latches, so that when the two sections are moved together to encompass the rails, the hooks engage the latches in interlocking fashion drawing both step sections into contact with the rails and immobilizing them relative thereto. In the actual construction of the ladder the first or the outer section of each step is mounted in a jig. After that, the rails are placed over the outer sections as they are mounted in place in the jig. Then the inner sections of the steps are placed over the outer step sections and snapped into place using the latches. Thereafter, the self tapping screws secure the assembly.

A further object of the invention is to provide ladder steps which meet in contact with the upright ladder rails in at least two different planes of contact. Preferably each of the step sections includes an upper and lower transversely extending surface, the two surfaces being joined together by webs extending therebetween. The provision of steps which are mounted to contract the ladder rails along two different planes gives added stability to the steps to resist the torsional forces that act thereon during use. Steps formed according to the preferred embodiment of the invention thereby are much safer than conventional steps formed largely in a single plane, in that even after prolonged use, they are unlikely to tilt downward under the weight of an ascending or descending individual. This provides an important safety feature for the improved recreational vehicle ladder of the invention.

An additional safety feature of the invention lies in the manner in which the fasteners mount the steps to the upright rails. Preferably, transversely extending screws are employed which pass through both step sections and through a transverse aperture in the rail itself to sandwich the rail between the two step sections. In the preferred form of the invention webs in the inwardly facing step sections are provided with recessed panels that receive the screw heads of transversely extending screws which secure the steps of the rails. The screw heads are thereby unlikely to snag the clothing of individuals using the ladder and thus cause an accidental fall. Also, the location of the screw heads, reduces the liklihood of causing scratches or other injuries to persons using the ladder.

DESCRIPTION OF THE EMBODIMENT

Figure 1:
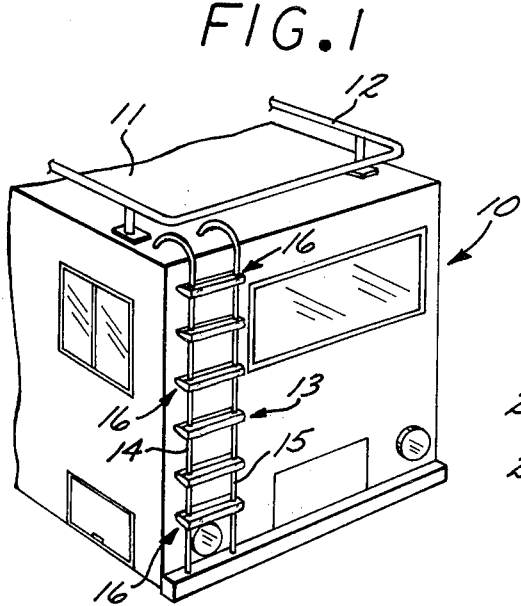
FIG. 1 is a perspective view of a ladder according to the invention mounted on a recreational vehicle.

A conventional recreational vehicle such as the camper 10 depicted in FIG. 1 has a cargo storage area on its roof 11 and a tubular aluminum or stainless steel guard rail 12 extending about at least a portion of the perimeter of the roof 11 with downwardly extending legs terminating in feet that are anchored to the roof 11. Access to the roof 11 from the ground or roadway is desirable both to store and remove cargo from the storage area on the roof 11, to check the fastenings of such cargo, for servicing vehicle equipment, such as a camper air conditioning unit, or to attain an increased height to make visual observations. For this purpose a ladder 13 is provided and is mounted on the rear of the vehicle 10 and extends upwardly in a near vertical orientation.

The ladder 13 is anchored to the roof 11 at the arcuately curved upper extremities of the upright parallel tubular stainless steel or aluminum ladder rails 14 and 15. A plurality of steps 16 are provided at vertically spaced intervals along the rails 14 and 15. Each of the steps or ladder treads 16 is laterally bifurcated generally along a plane defined by the disposition of the upright rails 14 and 15.

Each step 16 has an outer segment 17 and an inner segment 18 both formed of extruded aluminum approximately 0.063 inches in thickness and having transverse upper and lower surfaces 19 and 20 respectively. The transverse surfaces 19 and 20 are both longitudinally corrugated with ridges that extend laterally across the width of the ladder. While both the upper and lower surfaces are serrated for ease of manufacture, only the upper surface 19 actually needs the skid or slip inhibiting characteristics provided by the corrugations.

Figure 2:
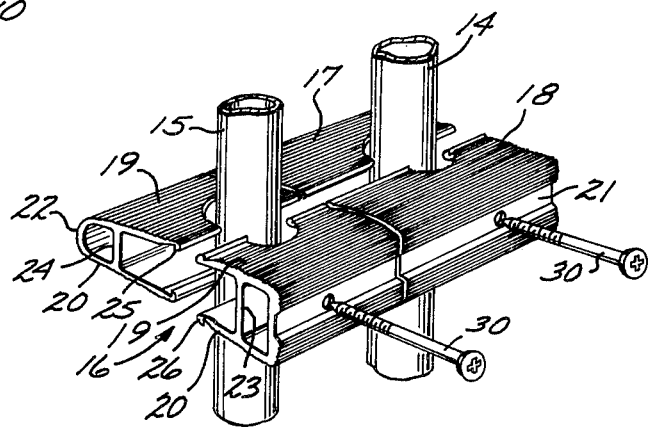
FIG. 2 is a perspective exploded view of a step of the ladder of the invention.
Figure 4:
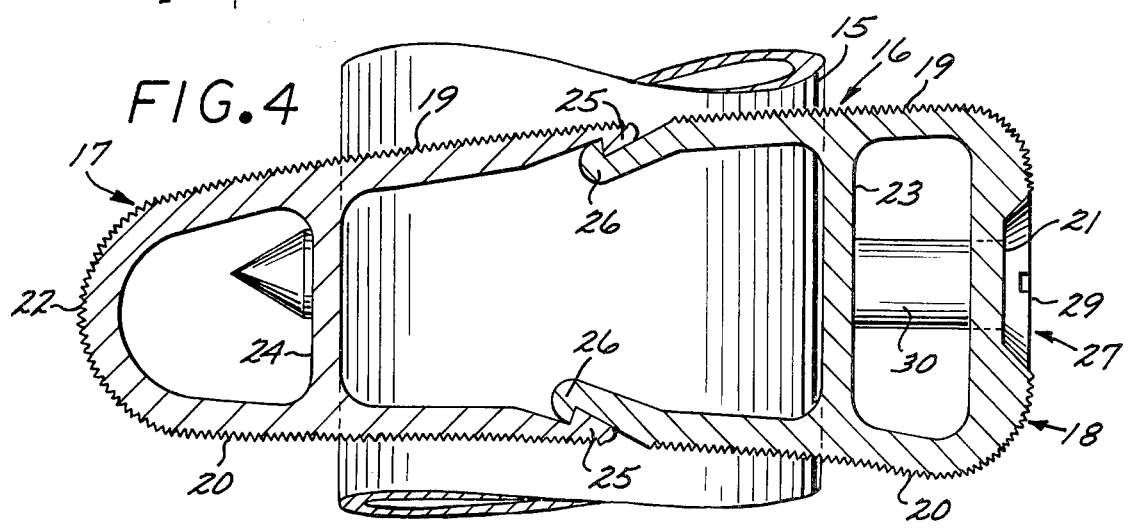
FIG. 4 is a sectional elevational view taken along the lines 4—4 of FIG. 3.

The upper and lower surfaces 19 and 20 of the outer step sections 17 curve toward each other and meet throughout their width along a spine, depicted at 22 in FIGS. 2 and 4. Interiorally disposed relative to the spine 22 of the step sections 17 are vertically extending supporting webs which hold the upper and lower surfaces 19 and 20 of each step section in spaced relationship. The webs 24 extend laterally across the widths of the outer sections 17 of the steps 16 between the spine of the associated step section and the upright rails 14 and 15 so as to give added stability to resist shear and torsional forces that bear on the step sections.

Similarly, the inner step sections 18 employ laterally extending webs 23 that hold the upper and lower surfaces 19 and 20 respectively in spaced apart relation. The inner extremities of the step sections 18 are held apart by proximately located vertically oriented laterally extending webs 21 that are recessed slightly therefrom, thereby forming recessed panels.

Figure 3:
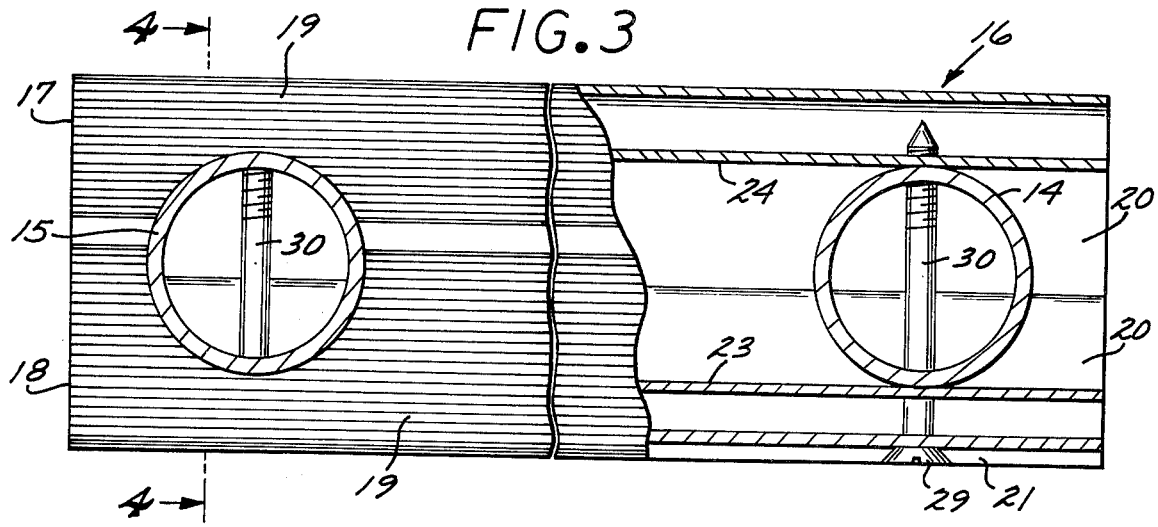
FIG. 3 is a plan view of the step of FIG. 2.

As depicted in FIG. 3, each of the step sections 17 and 18 is contoured with semicircular recesses on the upper and lower surfaces 19 and 20 adjacent to the upright rails 14 and 15. The semicircular recesses are aligned so that the sections 17 and 18 are contoured for snug positioning against the rails 14 and 15 and so that the sections 17 and 18 may be moved transversely toward each other into the positions depicted in FIG. 3 from opposite sides of the rails 14 and 15 to entrap the rails therebetween.

As illustrated in FIGS. 2 and 4, the upper and lower surfaces 19 and 20 respectively of the outer sections 17 terminate in a pair of transversely directed arms extending toward the rails 14 and 15 and equipped with some form of connectors, such as the hooks depicted at 25. The hooks 25 are positioned approximately in lateral alignment with the rails 14 and 15 so as to engage the mating latches 26 formed in the opposing arms that extend toward the rails 14 and 15 from the upper and lower surfaces 19 and 20 of the inner sections 18. Movement of the sections 17 and 18 transversely toward the rails 14 and 15 from the positions of FIG. 2 to the positions of FIG. 4 causes the hooks 25 to ride against the outside surfaces of the arms of the inner section 18 and to deflect them toward each other to ultimately engage the latches 26 in an interlocking relationship. The interlocking engagement of the hooks 25 of the arms of the outer section 17 and the latches 26 of the inner sections 18 throughout the width of the steps 16 draws the inner and outer sections 18 and 17 toward each other and toward the rails 14 and 15 to hold the steps 16 immobile relative thereto. By so positioning the steps or treads 16, self tapping screws 27 may be easily positioned in seated arrangement with their heads 29 residing in the recessed panel 21 of the inner sections 18 of the steps. The shanks 30 of the screws are directed transversely toward the opposing outer section 17 through apertures in the web 23 and through the rails 14 and 15. The ends of the shanks 30 are threaded and engage holes in the webs 24 of inner sections 17, thereby fastening the steps 16 securely in fixed disposition with respect to the upright rails 14 and 15. It is to be understood that while screws 27 which pass directly through the upright rails 14 and 15 are a preferred form of fastening means, other types of fasteners might also be employed. For example, the cross section of the upright rails 14 and 15 might be enlarged directly below each of the positions occupied by the steps 16. Alternatively, U-bolts might be employed to bracket the upright rails 14 and 15. Bolts or any other form of rod-like fastener may be employed in lieu of the screws 27, as may numerous other types of fasteners.

To assemble the ladder of the invention, the rails 14 and 15 are first positioned in mutually parallel orientation. The outer and inner step sections 17 and 18 respectively used to form each step 16 are moved transversely toward the rails 14 and 15 to entrap the rails therebetween. The arms of the sections 17 and 18 extend towards each other and when the section 17 and 18 arrive in position, the hooks 25 engage the latches 26 of the vertically spaced arms so that the step 16 is held at the proper vertical level. While in the proper orientation, the bolts 27 may be inserted into apertures in the recessed panel 21 of the inner sections 18. The screws 27 are passed through corresponding apertures in the rails 14 and 15 and are threadably engaged in holes in the webs 24 of the outer sections 17 of the steps 16. When all of the steps 16 have been assembled and mounted onto the rails 14 and 15, the ladder 13 is complete and may be mounted in position on the recreational vehicle 10 as depicted in FIG. 1.

It is to be understood that ladders constructed according to this invention will undoubtedly find numerous applications in areas other than in use with recreational automotive vehicles. Also, various different construction embodiments are possible. For example, the hooks 25 and latches 26 could be reversed, with the hooks extending from the inner tread section 18 and the latches extending from the outer tread section 17. Accordingly, the scope of the invention disclosed herein should not be construed as limited to the single embodiment depicted, but rather is defined in the claims appended hereto.

We claim:

1. A recreational vehicle ladder comprising parallel laterally separated elongated upright rails with front and back surfaces and secured at the upper and lower extremities thereof to said recreational vehicle and a plurality of steps arranged at vertically spaced intervals along said rails, each step being laterally bifurcated along a plane defined by the disposition of said rails and each step comprising outer and inner segments contoured for positioning directly against said rails respectively at the front and back surfaces thereof and including means extending between the segments of each step to interlock and to draw the segments of each step toward each other to bear directly against and encompass said rails to hold said steps immobile in longitudinal disposition relative to said rails, and fastening rods extending through said rails and joining said sections of each step.

2. The recreational vehicle ladder to claim 1 further characterized in that said outer and inner segments are each formed of extruded aluminum upper and lower surfaces joined by separated supporting webs displaced in spaced arrangement from said rails.

3. The recreational vehicle ladder of claim 2 further characterized in that laterally extending serrations are formed at least in said upper surfaces.

4. The recreational vehicle of claim 2 further comprising a laterally extending web joining said upper and lower surfaces of said outer segment proximate to the outer extremities thereof to form a recessed panel extending laterally between said upper and lower surfaces.

5. The recreational vehicle of claim 4 further characterized in that said fastening rods extend through said outer and inner segments and pass through said recessed panel and through said rails to secure said steps to said rails.

6. An improved ladder for disposition in spaced relation to an upright surface comprising:

a pair of parallel upright rails secured at their upper and lower extremity relative to said upright surface;

a plurality of horizontally oriented treads arranged at vertically spaced intervals along said rails and each having an inner extremity proximate to said upright surface and an outer tread extremities remote from said upright surface, each tread comprising:

a) a laterally extending section defining said outer tread extremity and having an upper weight supporting surface extending beyond said rails and having concave recesses of conforming geometric cross section to receive said rails and having a plurality of laterally spaced arms extending inwardly from said outer tread extremity, below said upper surface, each arm terminating in connecting means, and b) a laterally extending inner section defining said inner tread extremity and extending beyond said rails and having concave recesses of conforming geometric cross section to receive said rails and having a plurality of laterally spaced arms extending outwardly from said inner tread extremity in corresponding relatinship to said arms of said outer tread extremity and terminating in means engaged with said connecting means of said corresponding arms of said outer sections to draw said inner and outer sections into direct contact with each other and toward said rails to hold said treads immobile thereagainst relative thereto, and fastening means for securing said treads to said rails in fixed disposition relative thereto.

7. The improved ladder of claim 6 further characterized in that said connecting means are hooks and said means engaged therewith are latches.

* * * * *